United States Patent [19]

Hamburg

[11] Patent Number: 5,077,970
[45] Date of Patent: Jan. 7, 1992

[54] METHOD OF ON-BOARD DETECTION OF AUTOMOTIVE CATALYST DEGRADATION

[75] Inventor: Douglas R. Hamburg, Birmingham, Mich.

[73] Assignee: Ford Motor Company, Dearborn, Mich.

[21] Appl. No.: 536,372

[22] Filed: Jun. 11, 1990

[51] Int. Cl.$^5$ ............................................. F01N 3/20
[52] U.S. Cl. ...................................... 60/274; 60/276; 60/285
[58] Field of Search .......................... 60/274, 276, 285

[56] References Cited

U.S. PATENT DOCUMENTS

| | | | |
|---|---|---|---|
| 3,939,654 | 2/1976 | Creps | 60/276 |
| 4,000,614 | 1/1977 | Abthoff | 60/276 |
| 4,007,589 | 2/1977 | Neidhard et al. | 60/276 |
| 4,622,809 | 11/1986 | Abthoff et al. | 60/276 |
| 4,761,950 | 8/1988 | Nagai et al. | 60/276 |

FOREIGN PATENT DOCUMENTS

| | | | |
|---|---|---|---|
| 2735434 | 2/1978 | Fed. Rep. of Germany | 60/276 |
| 45913 | 2/1989 | Japan | 60/276 |
| 2178857 | 2/1987 | United Kingdom | 60/276 |

OTHER PUBLICATIONS

SAE Paper #800826, Hamburg et al., "A Closed-Loop A/F Control Model for Internal Combustion Engines", Jun. 1980.
SAE Paper #841297, Gamberg et al., "Adaptive Air/Fuel Control Applied to a Single Point Injection System for SI Engines", 1984.

Primary Examiner—Douglas Hart
Attorney, Agent, or Firm—Joseph W. Malleck; Roger L. May

[57] ABSTRACT

A method of on-board detection of the degradation of an automotive catalyst which receives the emissions from an engine placed in a closed-loop feedback control with an A/F characteristic sensor immersed in the emissions. The method comprises: (a) artificially modulating the frequency and/or amplitude of the control for a predetermined burst period; (b) sensing an A/F characteristic by an independent sensor substantially immediately downstream of the catalyst at events prior to and during the burst period; and (c) determining if there is an absence of a substantial change between events in the independently sensed A/F characteristic, thus indicating a degraded catalyst. The artificial modulation changes the oxygen exposure of the catalyst during a short catalyst interrogation period in a manner to magnify the oxygen absorption characteristic of the noble metals within the catalyst. The artificial modulation may comprise a frequency change of a fixed uniform increase, such as 2-3 times the normal limit cycle frequency of the engine control, preferably about 2-4 Hz, or may comprise a variable change of frequency or amplitude such as ramping with or without steps or interruptions.

28 Claims, 10 Drawing Sheets

MEASURED CLOSED-LOOP EGO SENSOR TIME RESPONSES

METHOD OF ON-BOARD DETECTION OF AUTOMOTIVE CATALYST DEGRADATION

BACKGROUND OF THE INVENTION

1. Technical Field

The invention relates to the art of on-board detection systems for catalyst efficiency, and more particularly to the art of relating such detector systems to engine controls that influence catalyst efficiency.

2. Discussion of the Prior Art

One of the important concepts of the 1970's was the closed loop air/fuel ratio (A/F) control for engines. Such control analyzed the oxygen content of the exhaust gases and used the analysis information to modify the A/F to bring it into conformity with a desired narrow range (A/F window) that maximizes catalyst converter efficiency. The sensor is placed upstream but close to the catalytic converter, and the A/F comparator computer, ingested with background information, is used to change the A/F controller on a continuous basis providing an overall average control of A/F near stoichiometry (see U.S. Pat. No. 4,000,614).

Such feedback control has been amplified by the use of two exhaust gas oxygen sensors, one upstream of the catalyst and the other downstream of the catalyst (see U.S. Pat. No. 3,939,654). The information of both sensors is integrated with the hope of more accurately maintaining the A/F within such desired window. Unfortunately, the exhaust gas oxygen sensors undergo a switching function at stoichiometry (i.e., from rich to lean or lean to rich), and due to the time delay between signals of the sensors, there is considerable hunting and poor response of the feedback engine control system. The prior art has resorted to extremely complex jump-back software algorithms to compensate for the signal delay between the sensors (see U.S. Pat. No. 4,761,950). However, the use of upstream and downstream exhaust gas oxygen sensors about a catalyst has not led to ideal catalyst efficiency levels and has not prevented catalyst degradation.

The art has recognized that the upstream and downstream exhaust gas oxygen sensor signals will be different resulting from oxygen storage capabilities of the catalyst (see U.S. Pat. Nos. 4,622,809; 4,007,589; and GB 2,178,857). Although the prior art has made this observation, it has not been able to devise a system that provides an accurate determination of good and bad catalysts even though armed with this information. One reason for this inability is that oxygen storage is not only caused by the noble metal (the key elements that determine catalyst life) but also by stabilizing oxide coatings on the substrate such as cerium oxide. In fact, the oxide coatings may account for the major proportion of oxygen storage, which coatings do not provide for the essential detoxification conversion. Thus, in an engine-catalyst control-loop having integrated upstream and downstream oxygen sensors, the cerium oxide coating may become evaporated due to over-temperature operation, or may be changed in crystal structure by phosphorus or silicon poisoning. The dual sensors will provide an indication that the catalyst is bad when in fact the noble metals may still be functioning properly. This "bad" indication results from the ability to see only large gross differences in oxygen storage, which differences are heavily weighted to the cerium oxide function, and also to the fact that noble metals inherently cannot store oxygen very long thereby making oxygen storage a very fleeting measure of functionality.

What is needed is a detector system that can differentiate accurately the oxygen storage capability of the catalyst due to the noble metals as opposed to that of oxide coatings. Such system must be able to magnify or accelerate such inherent oxygen storage capability of precious metals to make it more readily detectable.

SUMMARY OF THE INVENTION

The invention meets such need by providing a method of on-board detection of the degradation of an automotive catalyst which receives the emissions from an engine placed in a closed-loop feedback control with an A/F characteristic sensor immersed in the emissions, the method comprising: (a) artificially modulating the frequency and/or amplitude of the control for a predetermined burst period; (b) sensing an A/F characteristic by an independent sensor substantially immediately downstream of the catalyst at events prior to and during the burst period; and (c) determining if there is an absence of a substantial change between events in the independently sensed A/F characteristic, thus indicating a degraded catalyst.

The artificial modulation is to change the oxygen exposure of the catalyst during a short catalyst interrogation period in a manner to magnify the oxygen absorption characteristic of the noble metals within the catalyst. The artificial modulation may comprise a frequency change of a fixed uniform increase, such as 2-3 times the normal limit cycle frequency of the engine control, preferably about 2-4 Hz. The frequency change should be sufficiently high to provide one or more of the following: good catalyst conversion efficiency with no increase in emissions and no loss of conversion efficiency; the converted emissions will move through both sides of a desired conversion window; the strength of the signal-to-noise ratio is at least five; and ensure that the independent sensor is switching and is not saturated at or about stoichiometric. The frequency change should be sufficiently low enough in amplitude to provide little or no change in the engine output torque, and sufficiently low in frequency to prohibit weakened sensor signals due to mixing of the burst emissions within the catalyst.

Alternatively, the frequency change may be variable, such as initially a very high frequency which progressively recedes to a lower frequency substantially below that of the limit cycle frequency during the interrogation period.

If the artificial modulation comprises amplitude change, it may be variable during the interrogation period, such as being ramped upwardly from an amplitude level at or about zero and progressively increasing to an amplitude level substantially above the limit cycle amplitude. Alternatively, the amplitude change may comprise stepping or interrupted stepping during such ramping of the amplitude.

The "substantial change" to be determined by the process can be (i) a change in the degree of the frequency and/or amplitude of the A/F characteristic sensed by the independent sensor, or (ii) a change in time for the independent sensor to return to cyclical sensing operation, particularly when a ramped change of the signal is invited with the initial signal being substantially below that of the limit cycle frequency.

It is desirable that the catalyst be (i) of a three-way type because of the need to simultaneously decrease CO, HC, and $NO_x$ emissions; (ii) that the A/F characteristic sensor be an exhaust gas sensor of the switching type because of its proven dependability and widespread availability, but can be a laser EGO sensor such as the UEGO device; and (iii) that the closed feedback control for the engine have a proportional-integral (P-I) controller system which includes a feedback controller, computer calculator, and a fuel injector driver, the P-I control being desired because of its ability to provide fast time response combined with elimination of steady-state A/F offset errors.

The signals between the sensors may be maintained as independent or may be integrated, thereby including both a superimposed feedback and a monitoring signal. Such integration may preferably include a gain control and slow controller modifier to effect such integration and thereby eliminate offset steps imposed by the P-I control and avoid erratic action.

Preferably, the burst period will endure for about 18–20 seconds and will be brought into effect each time the closed-loop operation of the engine is reinstigated. Preferably, the interrogation period is restrained to be only effective when the engine is undergoing a steady-state speed condition such as 20–50 mph.

Preferably, the degree of absence to be determined in step (c) is a level of 50% of the fresh operating efficiency of the catalyst, which degree of efficiency can be taken as a ratio of the output characterized as a function of conversion efficiency. Alternatively, the degree of absence can be set to some intermediate percentage of conversion efficiency between a bad and good catalyst thereby indicating the degree of degradation.

DETAILED DESCRIPTION AND BEST MODE

Figure 1:
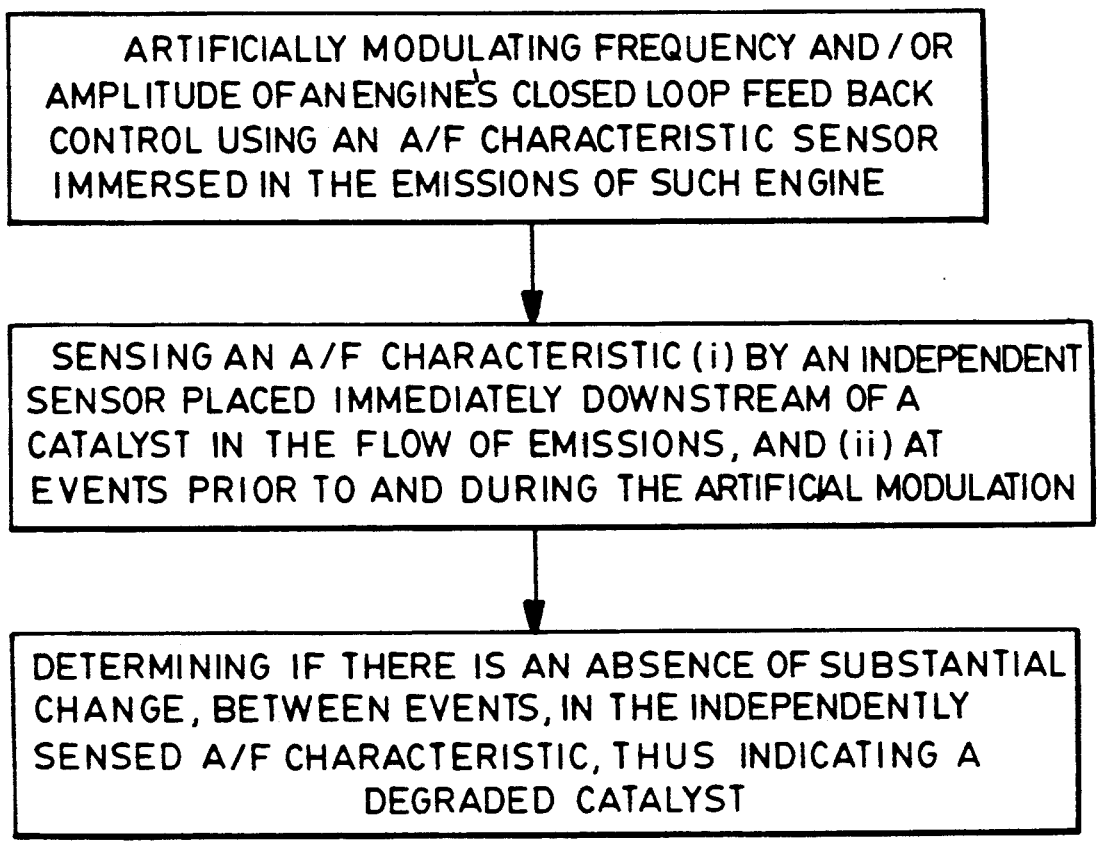
FIG. 1 is a block diagram of the essential steps of the method of this invention.

This invention uniquely utilizes, for the first time, a burst of air/fuel modulation to the engine to operate an on-board diagnostic system that interrogates catalytic converters in the exhaust system. The diagnostic system uses a scheme of interrogation as set forth in block diagram form in FIG. 1. The method of interrogation comprises: (a) artificially modulating at least one of the frequency and amplitude of a closed-loop feedback control between an engine and A/F characteristic sensor in the exhaust system of the engine having the catalyst converter interposed therein; (b) sensing an A/F characteristic by an independent sensor immediately downstream of the catalyst in the exhaust system, at A/F modulation events prior to and during the artificial modulation; (c) determining if there is an absence of a substantial change in the independently sensed characteristic when changing from one such event to the other, thus indicating a degraded catalyst.

CONTROL APPARATUS

Figure 2:
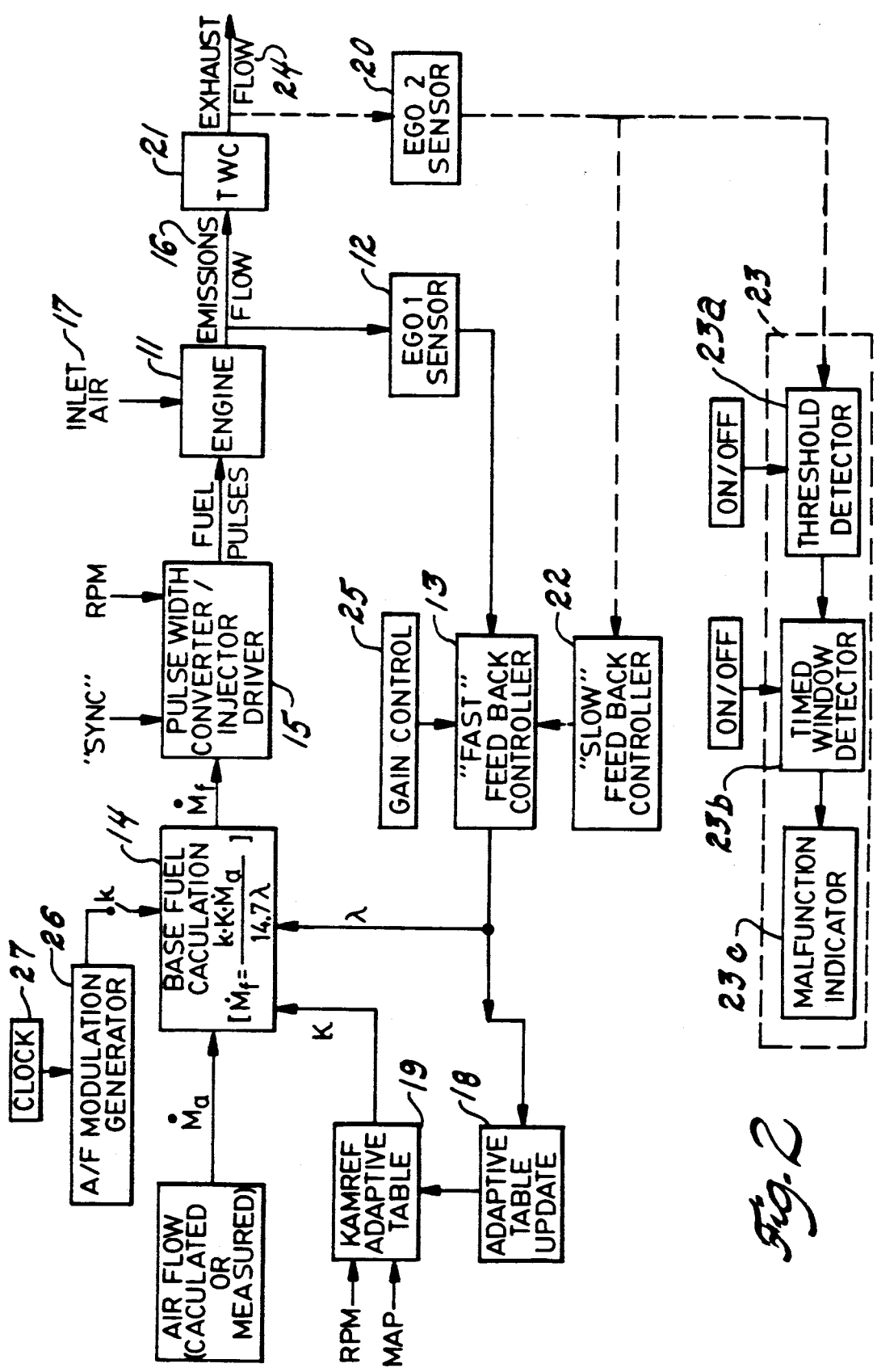
FIG. 2 is a schematic diagram of the elements of the apparatus useful in carrying out the method of FIG. 1.

Apparatus for carrying out the above scheme is schematically illustrated in FIG. 2. A conventional closed-loop feedback control 10 may be used, comprising a conventional EGO sensor 12 disposed in the emissions flow 16 from an engine 11, the signal from the EGO sensor 12 being connected to a feedback controller 13 which in turn supplies control information to an on-board computer or base fuel calculation means 14. Means 14 transmits a modulation signal to a fuel injector driver 15, the modulation signal controlling the pulse-width converter of the injector driver. There are several injector drivers to accommodate each of the combustion cylinders of the engine, each of which must receive fuel pulses to carry out combustion therein within the engine in combination with inlet air 17 supplied to the engine. This circuitous closed-loop feedback system is shown in full line in FIG. 2 and the flow of the feedback is indicated by arrows. To enhance the feedback control loop, it may further contain adaptive tables (18) (19) to provide more precise calculation of A/F during dynamic conditions where the feedback system cannot respond rapidly enough. Gain for the closed-loop feedback signal is defined herein to mean the strength of the feedback signal, and is provided by adjusting the coefficients of the proportional and integral terms in the P-I control algorithm. Gain of such system must be provided to reduce the amplitude of the limit cycle oscillation to essentially zero during the interrogation period so as not to obscure the artificial modulation. A typical closed-loop feedback control system, such as represented in full line in FIG. 2, is further explained in detail within the following references: "A Closed Loop A/F Control Model for Internal Combustion Engines", Douglas R. Hamburg and Michael A. Shulman, SAE Paper #800826, June, 1980; and "Adaptive A/F Control Applied to a Single Point Injection System for SI Engines", Thomas A. Huls, SAE Paper #841297, 1984.

This invention adds to such closed-loop control 10 an independent EGO sensor 20 interposed in the exhaust flow 24 emanating from catalyst converter 21. The EGO sensor is placed immediately downstream of such catalyst converter. The catalyst converter can be a three-way catalyst or an oxidation catalyst or an oxidation catalyst coupled with a reduction catalyst, as long as such catalyst is effective for detoxification of automotive emissions. The signal from the sensor 20 is relayed preferably to (i) a slow feedback controller 22, and (ii) an on-board detector system 23 for providing notice to the driver of the vehicle. The slow feedback controller 22 is incorporated to provide more precise control of the air/fuel ratio. This added control is necessary because the output of the EGO sensor after the catalyst must be maintained in the center of its switching range, and is not provided necessarily by the main feedback controller which is of a "fast" type. The detector system 23 may preferably incorporate first a threshold detector 23a having its own on/off switch, which signal, if it surpasses the threshold detector, is relayed to a timed window detector 23 of the on/off type, and if the signal falls within the timed window, the surviving signal is transferred to the malfunction indicator 23c. The signal from the second EGO sensor 20 can be superimposed upon the feedback control system 10 by use of such slow feedback controller 22 which can operate an additional gain control means 25 to ensure that the mean value of the exhaust A/F is within the catalyst window.

The burst of A/F modulation is provided by a generator 26 which is fabricated using a programmable timer in the engine control computer. (Clock 27 connected to generator 26 is simply the internal clock of the engine control computer.) The desired modulation waveform is generated by addressing the programmable timer in the control computer with an appropriate interrupt instruction at regular time intervals. In this manner, upon receipt of an interrupt request, the currently executing software code in the computer is suspended and separate code (referred to as an interrupt handler) is executed. The interrupt handler code is contained in memory at a location addressable by the interrupt hardware in the programmable timer. The purpose of the interrupt handler code is to generate the desired output waveform during the current interrupt interval. Note that "output" here refers to a memory location which contains the value of the output variable. Upon completion of the interrupt handler code, control returns to the main program.

As an example of how this would work, assume it is desired to generate a square wave with a frequency of 1 Hz and a magnitude of 2 units (ranging from +1 to −1). In this case, the programmable timer is commanded to interrupt the main program at one-half second intervals. The interrupt handling software then toggles the value of the output variable between +1 and −1. Extensions of this general method to the generation of more complex waveforms should be obvious to anyone skilled in the art. Examples of interrupt programming are available in numerous textbooks, including *Microcomputer Architecture and Programming*, by John F. Wakerly, published by John Wiley & Sons, 1981.

The output of such generator is transmitted to the base fuel calculator 14 to modify the coefficient k during an interrogation period provided by a clock 27 for the generator. The modified calculation for fuel mass ($M_f$) is used to change the pulse width for the converter of each of the injector drivers. As a result, the closely fired fuel pulses will provide a continuous flow of mixed combustion gases (emission flow 16) that has slight variations throughout the cross-sections of flow that result from exhaust discontinuities inherent in the engine system.

Figure 5:
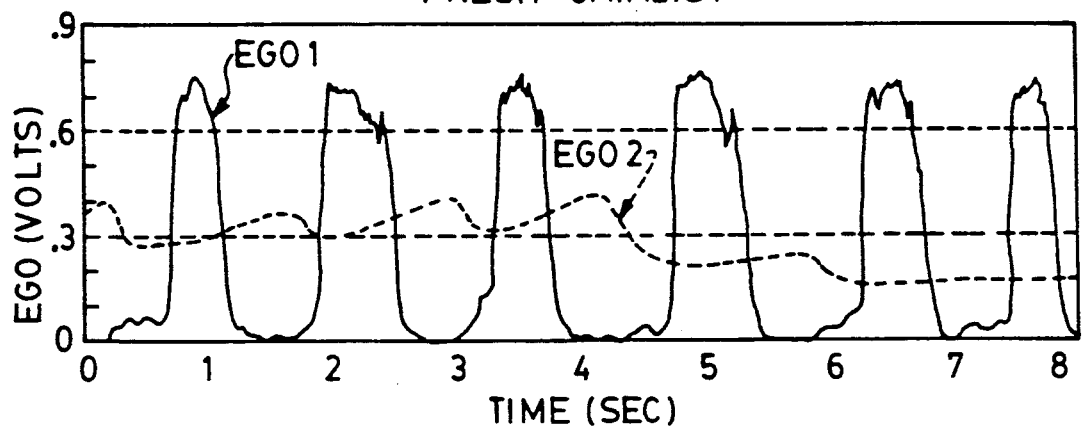
FIG. 5 is a composite of graphical views depicting the sensor signals of a fresh and an aged catalyst when using prior art controls.
Figure 5:
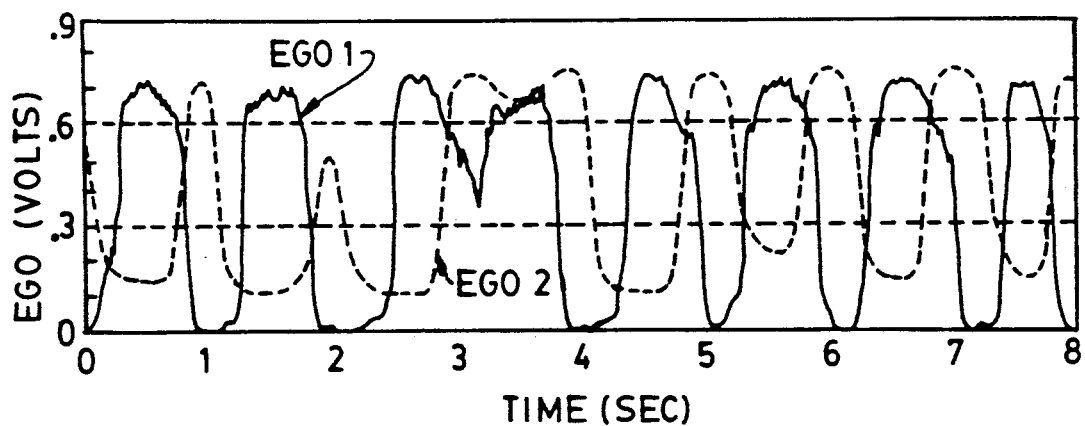

The first EGO sensor 12 is of the switching type that has a voltage signal constantly shifting back and forth in a limit cycle pattern between rich and lean as the discontinuities in the exhaust flow are sensed about stoichiometry. Such undulating signal will typically appear, as shown in FIG. 5. The voltaic type switchpoint sensors have been widely used in the industry and are referred to as EGO (exhaust gas oxygen) sensors, HEGO (heated exhaust gas oxygen) sensors, electrochemical cells, lambda sensors, and fuel cells. These sensors actually measure the partial pressure of oxygen in the exhaust gas produced by an engine; engine-out concentration is related to engine A/F ratio. When engine-out oxygen is measured with a gas analyzer, there is no unique relationship between oxygen concentration and A/F ratio, especially at A/F ratios near the stoichiometric ratio. It is the use of catalytic materials in the sensor that promotes an equilibrated oxygen direction. However, the space velocity at a small sensor electrode is so great that little equilibration takes place in the real engine operation. The sensor switches at stoichiometry, as predicted by the Nernst equation, only at fully equilibrated, stabilized, high temperature operation. Unfortunately, these conditions are never or rarely present in real engine operation as numerous SAE papers and patents indicate.

Figure 3:
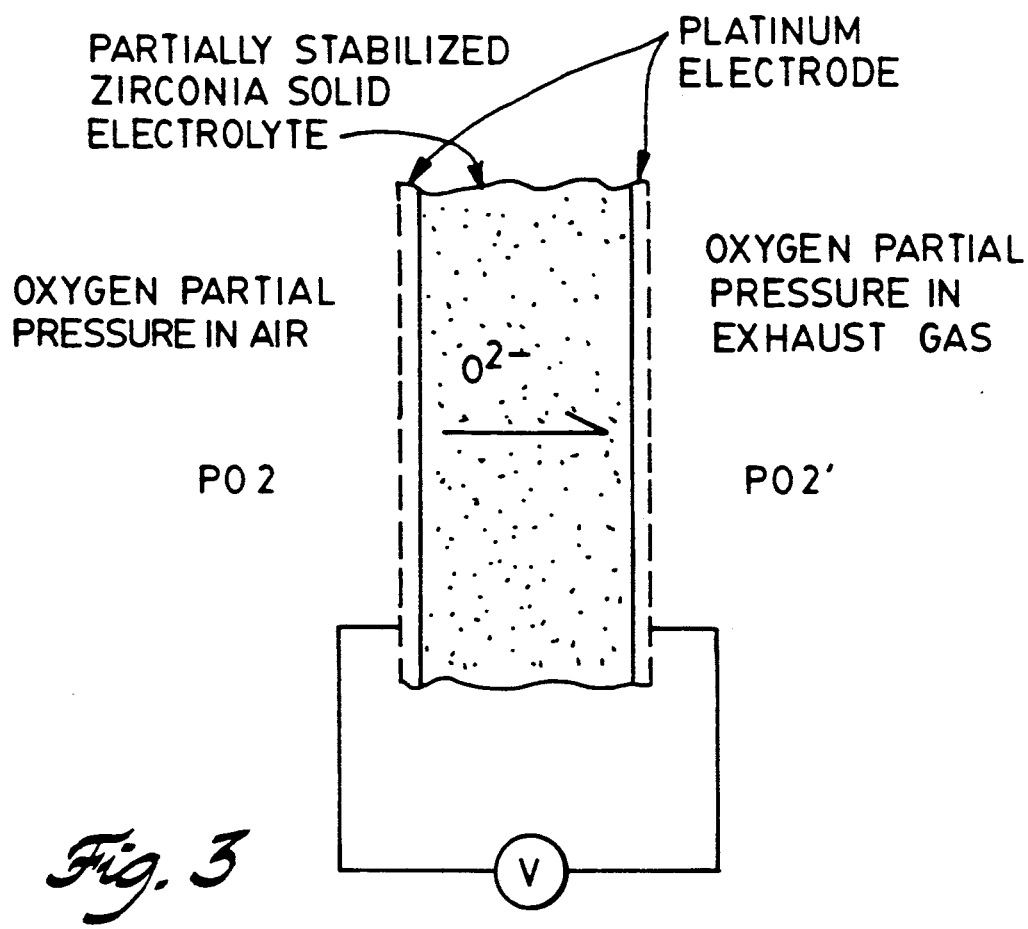
FIG. 3 is a schematic representation of a conventional oxygen sensor (EGO)
Figure 4:
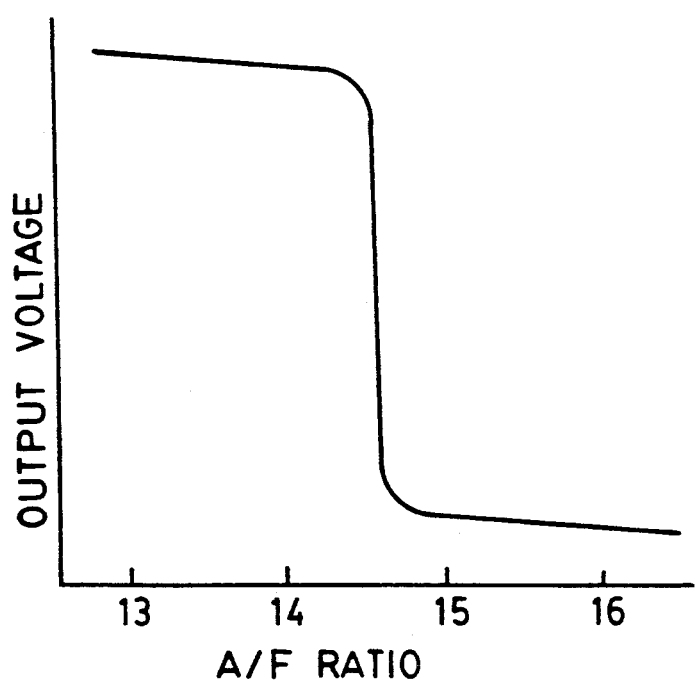
FIG. 4 is a plot of the typical output characteristics of the EGO sensor of FIG. 3.

The most widely used conventional EGO sensor for stoichiometric A/F control contains zirconia material ($ZrO_2$) which conducts oxygen ions. This system is called a Nernst-type electrochemical cell. The principle of the oxygen sensor is shown in FIG. 3. Opposite surfaces of a zirconia wall are exposed to the oxygen partial pressure of air, $Po_2$, and the oxygen partial pressure in the exhaust gas, $Po_2'$. An electromotive force (emf) is developed between platinum electrodes on opposite surfaces of the wall. Therefore, the oxygen sensor uses the zirconia as a voltage generating cell. When the sensor is exposed to exhaust gas, the output voltage is shown in FIG. 4. The value of the voltage changes so sharply at the stoichiometric point, that the sensor can indicate the stoichiometric ratio only.

The rapid change is in a sense a switching from rich to lean or lean to rich, very rapidly, and that gives the sensor its "switchpoint" name. Other EGO sensor types may use a resistive device consisting of a titania material having electrical resistance that depends on oxygen partial pressure. Since the resistivity of titania depends exponentially on temperature, this sensor requires a heater or a thermistor for temperature compensation.

ARTIFICIAL MODULATION

Figure 6:
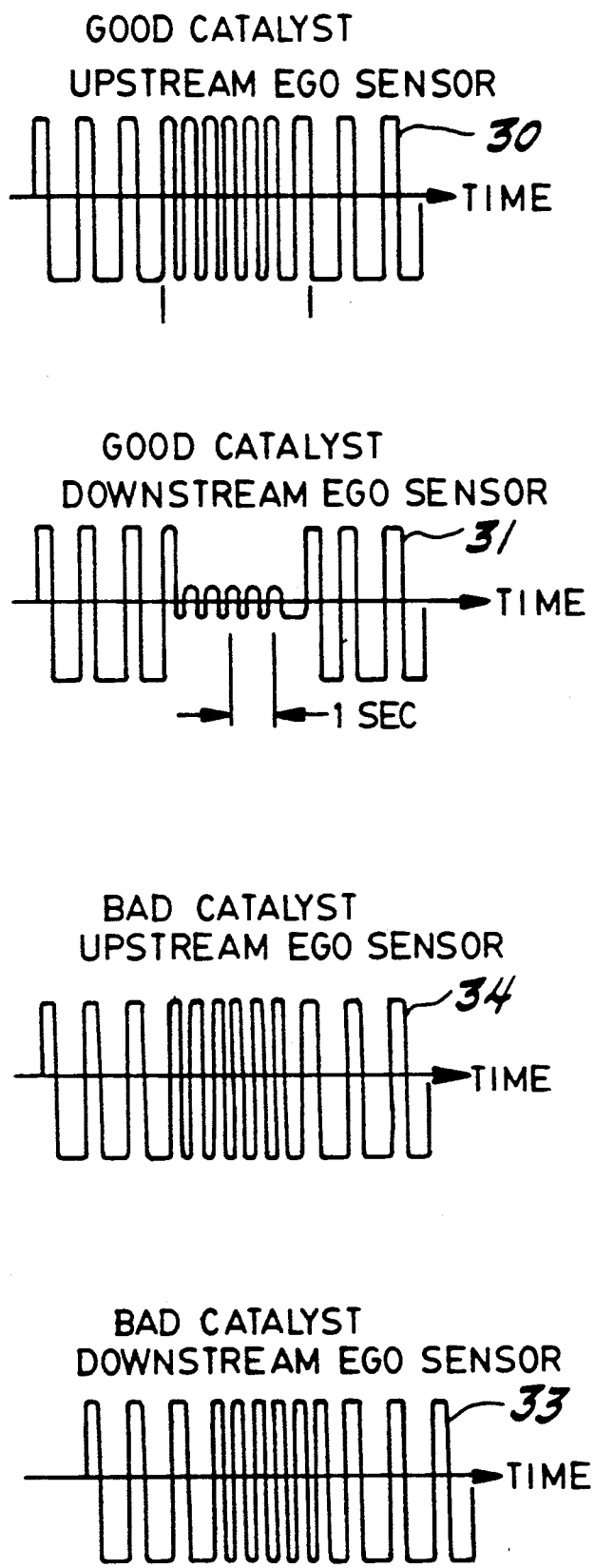
FIG. 6 is a composite of graphical views of the signal variations from the sensors used in the method of this invention depicting the differences between a good and bad catalyst.
Figure 7:
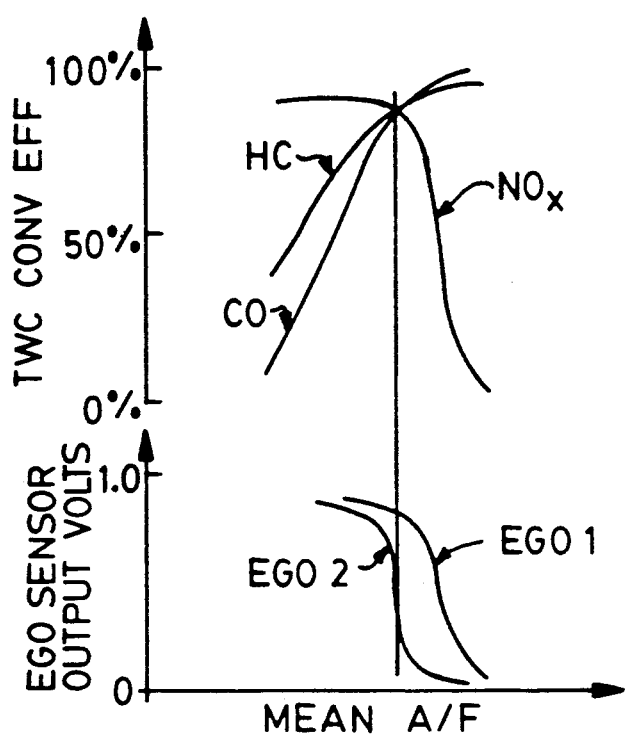
FIG. 7 is a composite of graphical views of the variation of the conversion efficiency of a typical three-way catalyst and the variation of EGO sensor output volts as a function of A/F ratio.

Modulation may be a frequency and/or amplitude change. Frequency modulation will stimulate the oxygen storing capacity of an effective catalyst during a short period of interrogation. Thus, a measure of the change in amplitude of the signal of the downstream sensor 20 will serve as a basis for indicating the effectiveness of the catalyst. As shown in FIG. 6, for a good catalyst, the sensor signal pattern will appear as plot 30 for the upstream sensor 12 and plot 31 for the downstream sensor 20. The significant reduction in amplitude during the one-second burst (or increased frequency modulation) is indicative of an increase in oxygen storage by the catalytic materials (i.e., precious metal coatings thereon). In a bad catalyst, there is little or no change in the amplitude variations of the signal for sensor 20 (plot 33) relative to the signal for sensor 12 (plot 34).

The degree of frequency modulation should satisfy several constraints, including: (a) an amplitude high enough to recognize the signal at the downstream sensor in a good catalyst; (b) high enough frequency to create a good conversion efficiency within the catalytic converter 21; (c) high enough amplitude to create a good signal-to-noise ratio, preferably about 5:1 or higher; (d) a high enough amplitude to swing through both sides of the desired control window for the A/F (window being used herein to mean the A/F range over which a good catalyst simultaneously provides high CO, HC, and $NO_x$ conversion efficiencies); (e) a high enough amplitude to switch the downstream sensor 20 between its lean and rich states without saturation. The frequency modulation should have a signal similarly (a) not too high in amplitude to minimize engine output torque variation, and (b) not too high in frequency to prohibit weakening the modulation signal by mixing that takes place within the catalyst.

The period of modulation should be sufficiently long to permit an observation or detection of a change in the signal at the downstream sensor, but should not be longer than needed so as not to affect normal engine operation and therefore should be controlled to a time period of about 15-20 seconds. The period of interrogation should only take place when the engine is in the closed-loop feedback operating mode, and preferably only when the engine is at a steady-state speed condition of about 20-40 mph.

To effect such frequency change or pulse, the A/F modulation generator 26 could be implemented in the engine control computer using conventional software programming techniques. Specifically, the computer internal clock frequency would be divided down (by computer software) to achieve the desired modulation frequency, and the amplitude of the resulting signal would be controlled (also by software) to provide the desired modulation amplitude. In operation, the generator function would be gated on and off by the engine control computer to only produce a modulation signal when the computer determined that a catalyst check should be performed. When the A/F modulation generator is grated off, its output will be set equal to 1.0 so that it will not affect the fuel flow to the engine. When the modulation generator is gated on, its output will oscillate around a value of 1.0 with an amplitude and frequency determined by the engine control computer, and the fuel flow to the engine will accordingly be modulated around its calculated base value. In order to prevent the normal limit cycle A/F fluctuations from obscuring the modulation signal, the gain of the A/F feedback controller will be substantially reduced during the interrogation period when the A/F modulation generator is gated on.

A typical frequency that meets the above constraints usually is in the range of 2-4 hertz and the modulation is effective to create a uniform fixed increase in the frequency for the A/F pulse.

Governmental agencies are presently formulating new requirements for on-board diagnostic systems which may require detection when the hydrocarbon conversion efficiency of the catalyst converter falls to 50% or less when operating in the closed-loop mode for the engine. In a frequency modulated mode for this invention, the output of an EGO sensor located downstream of the catalyst can be characterized as a function of catalyst conversion efficiency so that the output will indicate when the catalyst conversion efficiency has dropped to some specific value such as 50%. To do this, the following must be undertaken. The output of the EGO sensor located downstream of the catalyst will be monitored when the frequency modulated interrogation signal is applied to the engine. If the catalyst under test has good catalytic activity (e.g., 50% or greater), it will exhibit some degree of oxygen storage associated with the catalyst noble metal, and will therefore prevent the downstream EGO sensor from producing an output at the modulation frequency. If the catalyst under test is bad, it will not exhibit any appreciable oxygen storage, and the downstream sensor will produce an output at the modulation frequency. Thus, by choosing the appropriate modulation frequency (and amplitude), the invention is able to indicate whether the noble metal oxygen storage capacity of the catalyst is sufficiently high for the catalyst to be judged as good or bad.

In general, the catalyst conversion efficiency interrogation scheme would be performed after each time the engine went into a closed-loop operation for the first time following an engine startup, provided that the throttle was not closed and the vehicle was operating at a steady-state speed. If the engine operating conditions were to change unexpectedly during the interrogation interval, the procedure would be aborted and then repeated after the engine operating conditions once again became steady. To carry this out, the following should be provided. The engine RPM and airflow values which are present in the engine control computer will be monitored during the interrogation interval. If either of these values, or the rate-of-change of either of these values, changes by present limits programmed into the computer, the A/F modulation generator will be gated off, and the test will be stopped. The interrogation procedure will be reinstated as soon as the engine operating conditions become steady.

The A/F modulation burst should not cause any loss of catalyst conversion efficiency during the interrogation period and should consequently not cause any increase in the exhaust emissions. This is ensured by selecting the modulation amplitude and frequency to not significantly exceed the capabilities of a good catalyst. Furthermore, once the oxygen storage capacity of the catalyst has been exceeded as evidenced by the output signal from the downstream EGO sensor, the interrogation procedure will be terminated and engine operation will be allowed to return to normal.

The A/F modulation signal should be an additive pulse to that of the limit cycle oscillation amplitude, although the amplitude of the limit cycle oscillation should be reduced during the interrogation period so that it does not obscure the artificially generated A/F modulation signal. In certain extreme cases, it may be envisioned that the normal closed-loop limit cycle oscillation amplitude may serve as the interrogation signal. However, since the limit cycle amplitude is relatively small, and since the switchpoints of the upstream and downstream EGO sensors are likely to be slightly different, the downstream sensor could remain in either its lean or rich state, depending upon the actual mean A/F, and thus might fail to indicate a defective catalyst. Therefore, use of high amplitude A/F burst signals will tend to avoid this potential problem.

Superimposing the second sensor feedback onto the closed-loop feedback has several advantages when using artificial frequency modulation. EGO sensors located before and after a three-way catalyst can have different A/F switchpoints due to exhaust gas equilibration effects produced by the catalyst. As shown in FIG. 4b, there is an inherent time delay between the sensing of the same gases by the first and the second EGO sensor. In an A/F feedback system, the closed-loop A/F which results when the EGO sensor is placed after the catalyst is more accurate (in terms of being in the center of the catalyst window) than when the EGO sensor is placed in front of the catalyst. The disadvantage of using an EGO sensor after the catalyst for feedback, however, is that the overall response time of the A/F control system is degraded because of the time delay introduced by the catalyst. Hence, if only one EGO sensor is used, the sensor is placed in front of the catalyst in order to achieve the fastest closed-loop correction time possible for any A/F disturbance. This does produce error in A/F control, but the error must be offset by some means, such as adding a bias to the sensor output. A better compensation for the use of two EGO sensors is to allow the upstream EGO sensor to provide the fast response feedback correction, while the EGO sensor placed after the catalyst provides the accurate mean A/F. To combine such effects, the output of the upstream EGO sensor is passed through a high-pass electronic filter, and the output of the downstream catalyst sensor is passed through an electronic low-pass filter. The filter outputs are then combined in such a way as to provide a single A/F feedback signal for the engine feedback controller. This "composite" feedback signal would have both the proper high and low frequency components and would thus yield a fast response time combined with the "correct" A/F value.

However, it is desirable when using the combined EGO sensors in a superimposed circuitry to set the mean value of A/F feedback controller by use of the downstream EGO sensor. The output of the downstream EGO sensor must be in the middle of its own range so that it will be able to respond to the artificially imposed A/F modulation. If the downstream EGO sensor output was not in the middle of its range, but was saturated at either of its "high" or "low" limits, it would not necessarily respond correctly to the artificially imposed A/F modulation and a false indication would result.

Figure 8:
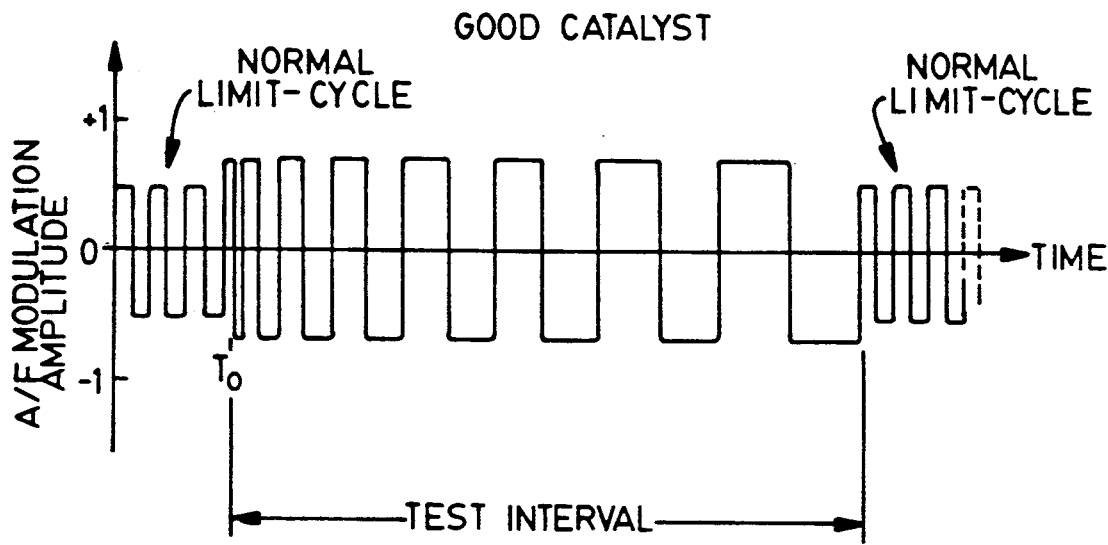
FIG. 8 is a composite view of the signal variations during an interrogation period using the method of this invention with variable frequency change, for a good catalyst and for a bad catalyst.
Figure 8:
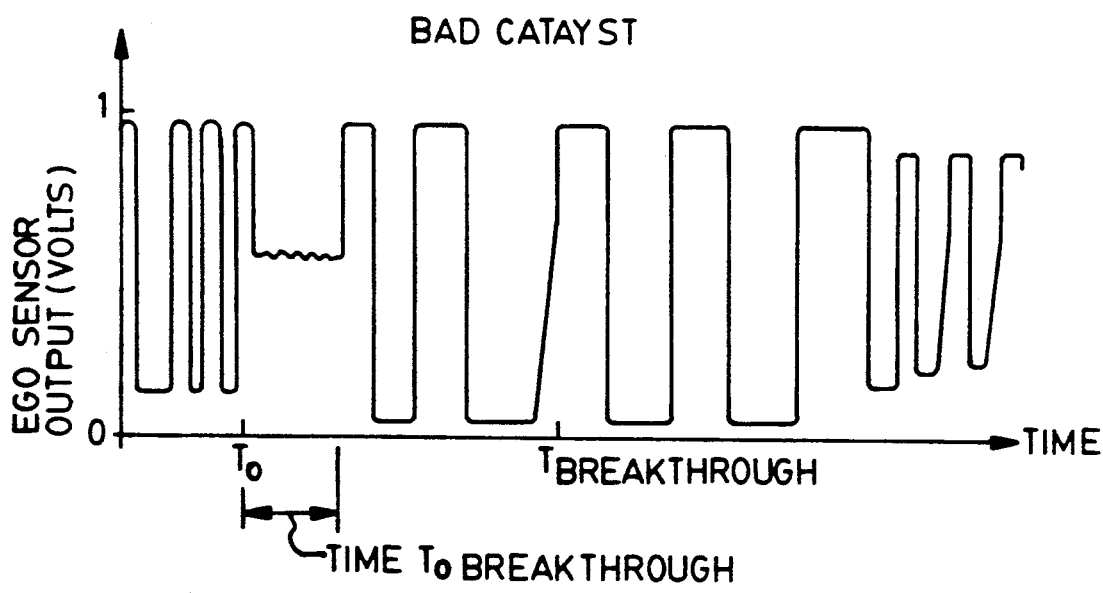

It is possible to operate the system without superimposing the signal from the downstream sensor onto the feedback system for the engine when using artificial frequency modulation. To this end, and as shown in FIG. 8, the artificial frequency modulation of the A/F controller is initiated at a high frequency at the beginning of the interrogation period and progressively reduced to below the normal limit cycle frequency of the closed-loop feedback system at termination of the interrogation period. The downstream EGO sensor monitors only the output of the catalyst and does not enter into engine control through the conventional feedback system. This has certain advantages. The ability to operate using only the downstream EGO sensor is important from a reliability/durability standpoint. This is because EGO sensors which are installed downstream of a catalyst do not deteriorate or age like EGO sensors which are installed upstream of the catalyst. Sensors installed upstream of the catalyst deteriorate because they are subjected to pulsed raw engine exhaust, whereas sensors installed downstream of the catalyst are "protected" by the catalyst detoxification activities.

The use of ramped frequency modulation in this embodiment mode will cause the A/F of the engine to oscillate around stoichiometry with a frequency which decreases through some appropriate range of values during the catalyst interrogation test. For example, the modulation frequency might be decreased in eight separate steps of one cycle each covering a frequency range from 2 Hz to 0.25 Hz. The actual frequency steps might be 2 Hz, 1 Hz, 0.67 Hz, 0.5 Hz, 0.48 Hz, 0.33 Hz, 0.29 Hz, and 0.25 Hz, in which case the total time for a complete frequency "sweep" would be about 18 seconds. It is desirable that the amplitude of the modulation would be generally constant during the catalyst test, and possibly might be set at approximately the same amplitude as the normal limit cycle oscillation, which would be approximately $\pm 0.5$ A/F. However, to increase the sensitivity of the test, it might be advantageous to set the amplitude higher as shown in FIG. 8. Again, the specific characteristics of the A/F modulation should be selected to appropriately assess the catalyst activity without causing objectionable variations in the engine output torque or exhaust emissions.

Figure 9:
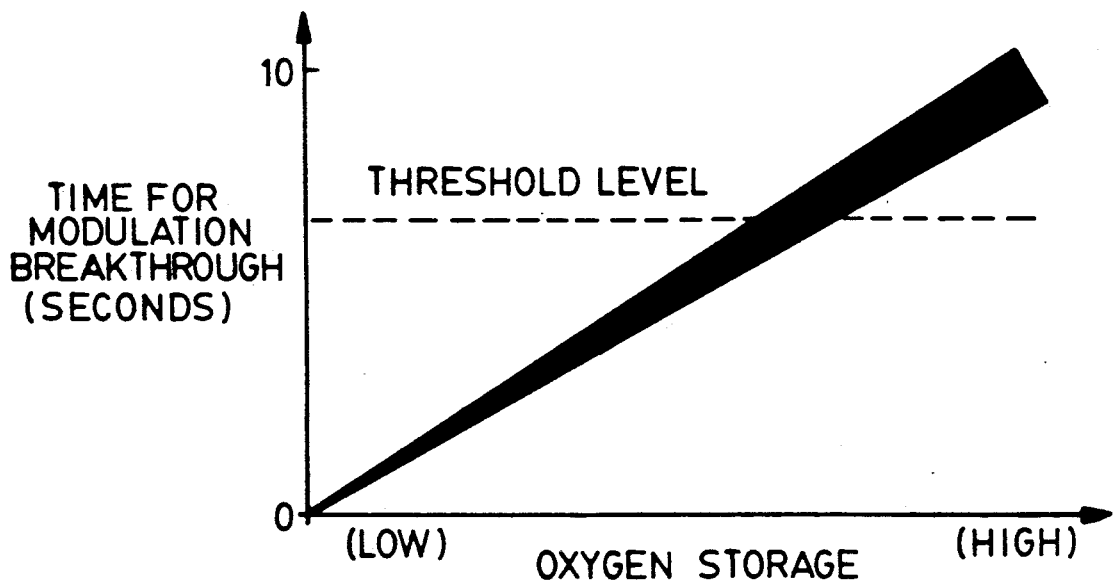
FIG. 9 is a graphical illustration of the time for modulation breakthrough as a function of oxygen storage.

When such ramped frequency modulation is applied, the output of the EGO sensor located downstream of the catalyst will start switching when the applied A/F frequency reaches a level which exceeds the oxygen storage capacity of the catalyst. This is illustrated in FIG. 8, which shows the resulting output voltage versus time for an EGO sensor located downstream of the catalyst when the frequency modulated A/F signal is applied to the engine. When the catalyst in the system is "good", i.e., when it has substantial oxygen storage capacity, the downstream EGO sensor will not detect any modulation breakthrough until the A/F modulation frequency has reached some low value. When the catalyst is faulty (and thus has very little storage capacity), modulation breakthrough will be detected by the downstream EGO sensor at a much higher A/F frequency. Since the A/F modulation frequency is decreased approximately linearly with time, the oxygen storage of the catalyst can be determined by simply measuring the time that it takes for the EGO sensor to start switching after the test cycle has begun. As shown in FIG. 9, the time required for modulation breakthrough to occur plotted as a function of the oxygen storage of the catalyst is illustrated. For the method of this invention to work properly, in this mode, the mean value of the A/F modulation must be kept in the center of the catalyst window, which should not be a problem for properly designed A/F feedback control systems. To prevent false indications by the EGO sensor, detection of modulation breakthrough by the downstream EGO sensor will not be considered to have occurred unless the sensor output voltage has switched between its normal "high" and "low" limits for several cycles after the initial breakthrough has been detected. "Breakthrough" is defined herein to mean that the oxygen storage capacity of the catalyst has been exceeded, and the modulation signals pass through the catalyst.

It is only necessary to utilize the downstream EGO sensor for detection and monitoring the output of the catalyst in this method mode. The upstream EGO sensor, of course, is still used as part of the basic A/F feedback control system so that the A/F modulation applied to the engine is precisely controlled and known.

Figure 10:
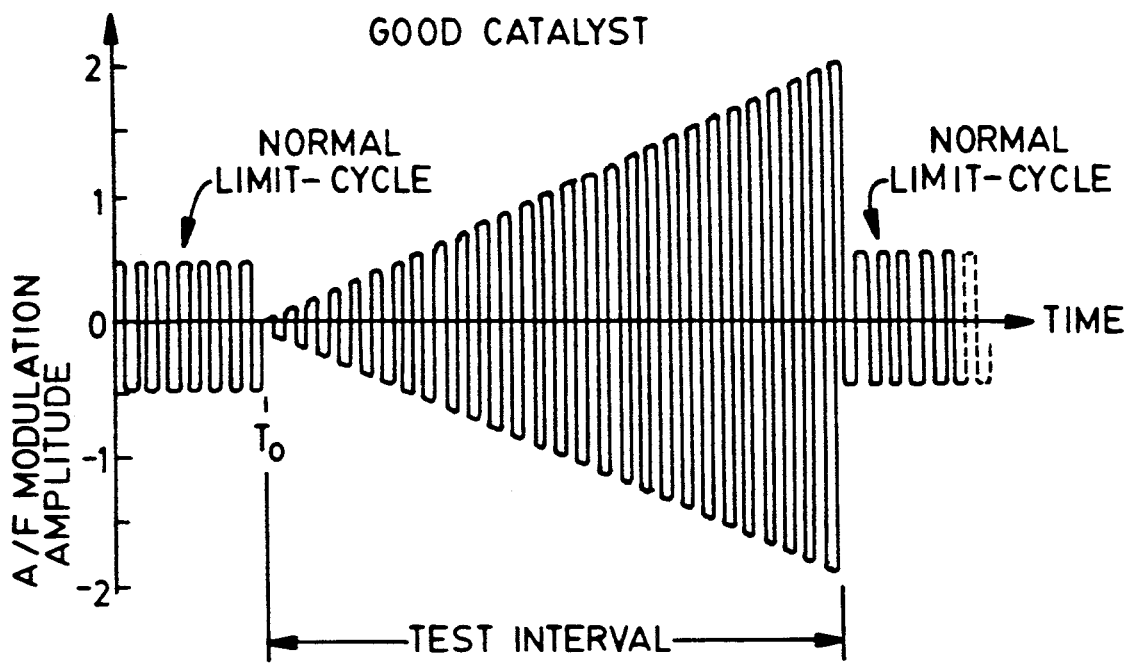
FIG. 10 is a composite of graphical illustrations of the variation of the sensor signal during an interrogation period for amplitude modulation, showing the signal for a good and for a bad catalyst.
Figure 10:
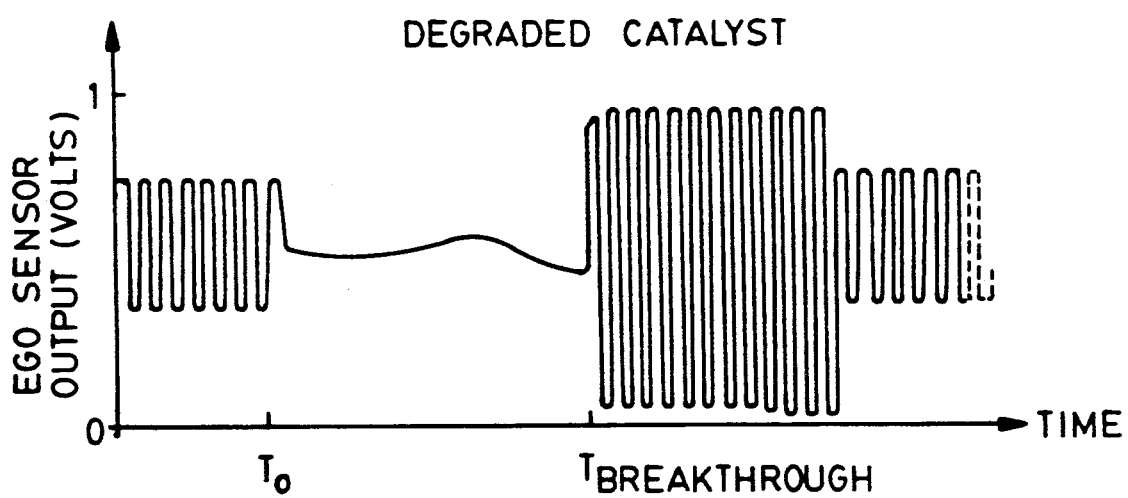
Figure 11:
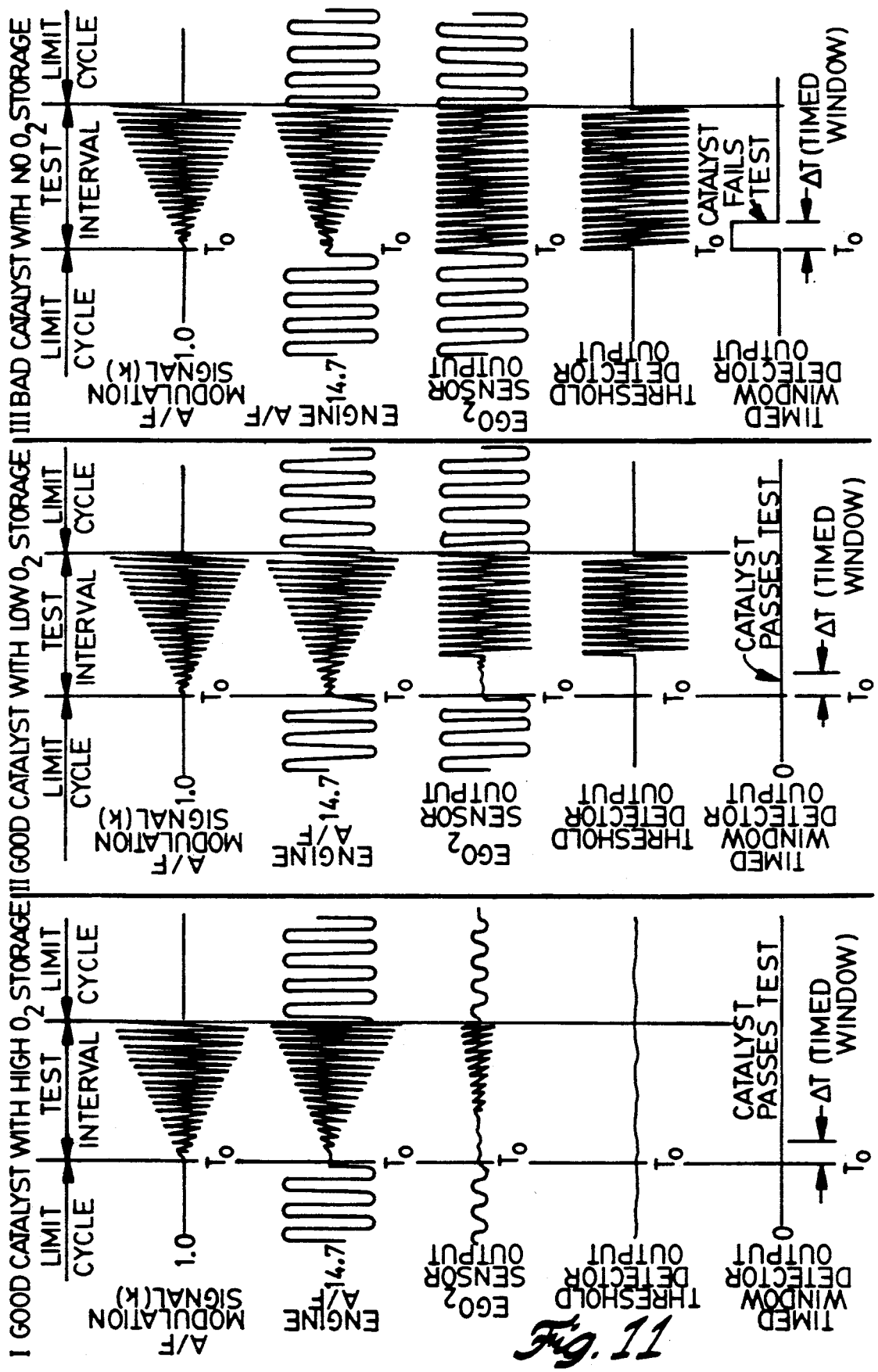
FIG. 11 is a composite of graphical views of the condition of the signals for FIG. 10 as detected along the various elements of the apparatus system, for a good catalyst, a partially degraded catalyst, and for a bad catalyst.
Figure 12:
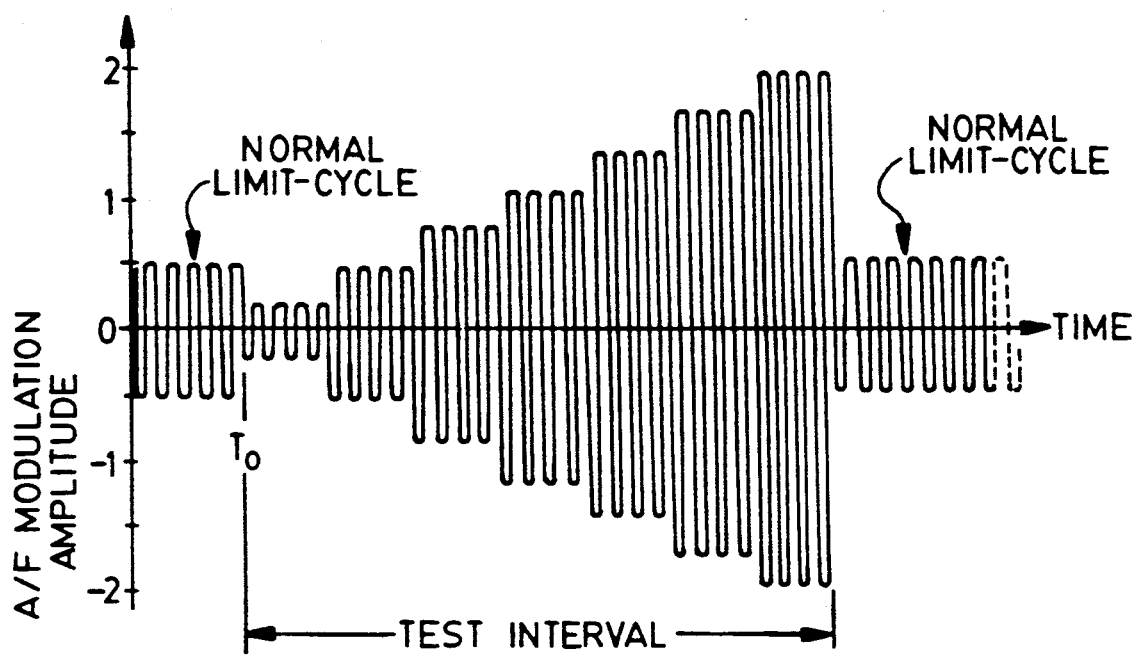
FIGS. 12–13 are graphical illustrations of the variation of the signal during an interrogation period for amplitude modification that includes stepped and interrupted stepped modulation, respectively.

To utilize artificial amplitude modulation, reference is made to FIGS. 10–12. In FIG. 10, the A/F amplitude modulation is created by reducing the normal limit cycle A/F ratio to some dramatically reduced amount and then gradually ramping or increasing the modulation to a level which is substantially in excess of the normal limit cycle at the remainder of the interrogation or test interval. This causes the A/F amplitude of the engine to ramp up from something about zero (or some small value) to a relatively large amplitude, such as three or four A/F's peak-to-peak, in a time interval of about 10–20 seconds. The frequency of the modulation would be in the range of about 0.5–2 Hz, and for convenience might actually be the limit cycle frequency of the A/F feedback controller. Again, the modulation should be selected to properly monitor the catalyst without causing objectionable variations in the engine output torque or exhaust emissions. The waveform resulting from the use of such ramped amplitude modulation is represented in the upper portion of FIG. 10 as that which would appear on the upstream EGO sensor, but which sensor is not in connection with sensor 2. The downstream EGO sensor will start switching when the applied A/F amplitude reaches a level which exceeds the oxygen storage capacity of the catalyst. When the catalyst in the system is "good", i.e., when it has substantially oxygen storage capacity, it will take larger A/F amplitudes applied to the engine to cause the modulation breakthrough which can be detected by the downstream EGO sensor. On the other hand, when the catalyst is faulty, modulation breakthrough will be detected by the downstream EGO sensor at a much lower A/F amplitude. Since the modulated A/F amplitude in the invention is ramped up as a function of time, the oxygen storage of the catalyst can be determined by simply measuring the time that it takes for the EGO sensor to start switching after the A/F modulation ramp has been initiated.

In operation, for this mode, the engine control computer would generate a ramped A/F modulation signal which would be applied to the engine's fuel metering system. The computer would then determine the time required for the EGO sensor located downstream of the catalyst to start switching at the modulation frequency. If this time exceeded some previously calibrated threshold level, then the catalyst would be deemed to be good and the computer would so indicate the condition by actuating the malfunction indicator light. If the time for the downstream EGO sensor to start switching was less than the calibrated threshold level, then the catalyst would be deemed to be bad. Once a determination of the catalyst condition is made, there is no need to continue the test any further. The A/F modulation could thus be turned off and normal closed-loop A/F control would be resumed. Furthermore, it would be desirable to turn off the A/F modulation as soon as possible in order to avoid potentially objectionable engine torque variations which might otherwise occur at the higher A/F modulation amplitudes.

A significant advantage of artificial amplitude modulation is its ability to predict when the catalyst may be approaching its failure point, that is, it may be able to indicate the degree of degradation of the catalyst. Reference should be made to FIG. 11 which shows various waveforms for the gaseous emissions, one portion of the figure being for a good catalyst, the center portion being for a partially degraded catalyst, the the right-hand portion being for that of a bad catalyst. Starting at $T_0$, the on-board computer will reduce the gain of the feedback system so that the amplitude of the limit/cycle A/F oscillation is essentially zero. The computer will also "close a switch" and apply the A/F modulation signal "k" (shown in FIG. 2) to the base fuel calculation block. Also at $T_0$, the computer will turn on both the threshold detector and the timed window detector (also shown in FIG. 2). The timed window detector will determine whether or not the output of the downstream EGO sensor exceeds a particular threshold during a predetermined time interval. This time interval is the timed window ($\Delta T$) shown in FIG. 11. $\Delta T$ corresponds to the minimum oxygen storage time which a good catalyst should have. If the output of the downstream EGO sensor exceeds the set threshold during the timed window interval, the catalyst will be judged to be defective. The computer will generate a malfunction indication, and then terminate the test. If the output of the downstream EGO sensor does not exceed the threshold during the timed window interval, the catalyst will be judged to be good. The computer will then terminate the test without generating a malfunction indication. Note that in the left-hand portion of FIG. 11 the breakthrough of a satisfactory amplitude for the downstream sensor does not occur until after a considerable period of time during the interrogation period and thus the catalyst passes the test. This shows up not only in the waveform for the downstream sensor, but certainly is clear in terms of the detector output signal in that it shows no variation. However, in a partially degraded catalyst, the breakout voltage signal for the second sensor does in fact occur after the catalyst has passed its time period, but it shows that the time period is getting relatively close to the threshold for not passing. This shows the degree to which the catalyst still maintains oxygen storage capacity. In the right-hand portion of FIG. 11, the breakout voltage signal for the downstream sensor occurs before the expiration of the minimum time period and thus the catalyst is deemed to have failed the test.

Figure 13:
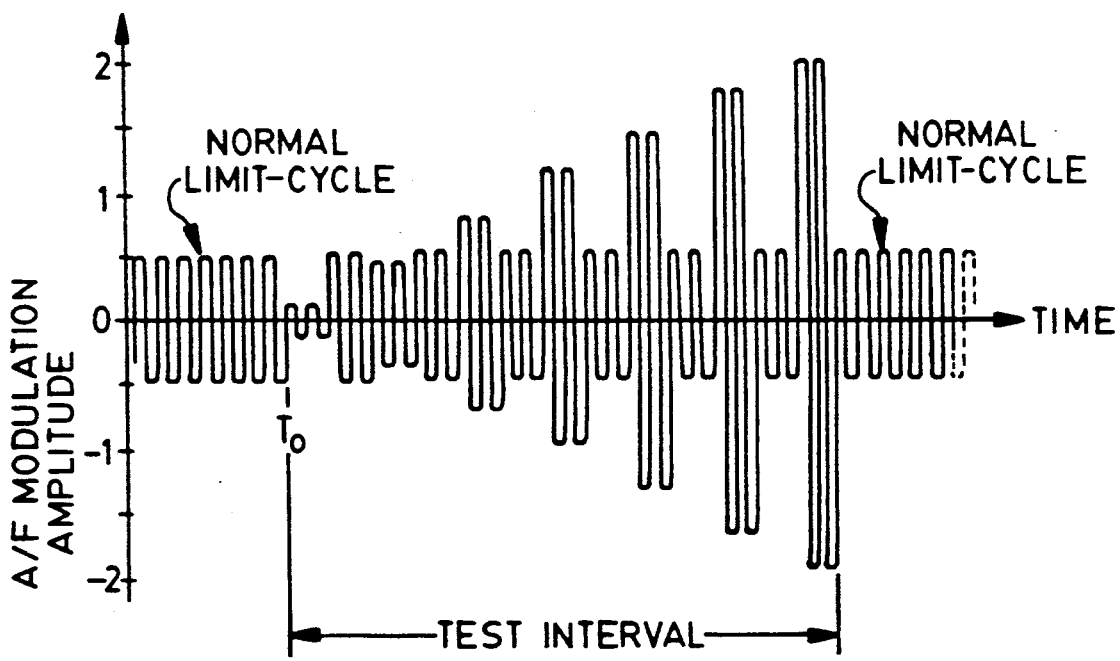

A variation of the amplitude modulation is shown in FIGS. 12–13. The A/F could be increased in various steps, each lasting several cycles, as illustrated in FIG. 12. The advantage in creating steps along the ramping effect is that the interrogation can be interrupted at any time (for example, when operating conditions are no longer steady) and then conveniently resumed at the same modulation level when the interruption ended. Still another variation of amplitude modulation is shown in FIG. 13. The A/F could be increased in steps, but the steps can be separated by periods of normal A/F limit/cycle operation. The resulting A/F modulation test signals have their own secondary oscillation. The primary advantage in using such an oscillated ramped amplitude variation is that it provides a stabilizing region between the various modulation steps, thus potentially improving the reliability and accuracy of the catalyst test. This latter type of modulation waveform would be particularly advantageous if the test cycle were interrupted, for example, by the engine operations conditions becoming temporarily nonsteady during some period in the test interrogation period.

A/F modulation test signals required for this invention can be obtained by (a) having the engine control computer generate the necessary modulation in a "stand-alone" manner, or (b) simply increasing the gain of the normal A/F feedback system during the test interval. The stand-alone scheme has the advantage that the modulation frequency can be selected to be any desired value, and thus can be optimized to match the particular catalyst formulations used. The feedback gain scheme, on the other hand, can have an advantage in that it can be very simple to implement, but it has to accept whatever limit cycle frequency occurs.

Preferably, the burst is for a time period of about 18-20 seconds and is advantageously applied each time the engine control returns to closed-loop operation and only during a steady-state period of engine operation such as within the speed range of 20-50 mph.

If artificial modulation comprises amplitude change, it is preferable that the amplitude change be variable during the interrogation period and may be ramped from an amplitude substantially near zero to in excess of the limit cycle frequency amplitude at the end of the interrogation period, or the amplitude variation may be stepped and even interrupted within such stepped configuration.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. A method of on-board detection of the degradation of an automotive catalyst which receives the emissions from the engine placed in a closed-loop feedback control with an A/F characteristic sensor, comprising:
   (a) artificially modulating at least one of the frequency and amplitude of said control for a predetermined burst;
   (b) sensing an A/F characteristic by an independent sensor substantially immediately downstream of said catalyst at A/F modulation events prior to and during said burst; and
   (c) determining if there is an absence of a substantial change in the independently sensed A/F characteristic when changing from one such event to the other, thus indicating a degraded catalyst.

2. The method as in claim 1, in which said artificial modulation changes the oxygen exposure of the catalyst during a short catalyst interrogation period in such a manner as to magnify the oxygen absorption characteristic of the catalyst material.

3. The method as in claim 1, in which said substantial change is (i) a change in degree of at least one of the frequency and amplitude of the A/F characteristic sensed by said independent sensor, or (ii) a change in time for the independent sensor to return to cyclical sensing operation.

4. The method as in claim 1, in which said artificial modulation comprises a frequency change.

5. The method as in claim 4, in which said frequency change is a uniform fixed increase.

6. The method as in claim 5, in which said frequency increase is 2-3 times the normal limits cycle frequency of said control.

7. The method as in claim 4, in which said frequency change is in the range of 2-4 Hz.

8. The method as in claim 4, in which said frequency change is sufficiently high to provide one or more of the following: (a) a good conversion efficiency for said catalyst which is does not increase emissions nor create a loss of conversion efficiency; (b) the emissions will move through both sides of the desired conversion window; (c) the independent sensor signal will have a signal-to-noise ratio of at least 5; (d) the independent sensor will be effectively switched at or about stoichiometry without saturation.

9. The method as in claim 5, in which said artificial modulation comprises an amplitude change, and such amplitude change is sufficiently low enough to (a) minimize the output torque variations of the engine, and (b) prohibit a weakened independent sensor signal due to mixing of the modulated emissions within the catalyst.

10. The method as in claim 4, in which said frequency change is variable.

11. The method as in claim 10, in which said variable frequency change is varied from a frequency in excess of the limit cycle frequency to that which is below the limit cycle frequency for the engine control.

12. The method as in claim 1, in which said catalyst is a three-way catalyst and the independent sensor is an oxygen sensor of the switchpoint type.

13. The method as in claim 1, in which said independent sensor is a hydrocarbon sensor.

14. The method as in claim 1, in which said artificial modulation comprises amplitude change.

15. The method as in claim 14, in which said amplitude change is variable during said burst period.

16. The method as in claim 15, in which said variable amplitude change comprises ramping said amplitude from a value which is substantially near zero to an amplitude value in excess of the limit cycle frequency amplitude.

17. The method as in claim 15, in which said variable amplitude change is stepped as it is increased.

18. The method as in claim 17, in which said variable stepped amplitude change is interrupted at one or more of said steps.

19. The method as in claim 15, in which the amplitude modulation is accompanied by a frequency of either the limit cycle frequency of the control or 0.5-2.0 Hz, and said breakthrough is screened to occur only when (i) the sensor output voltage switches between a normal high and low for at least three cycles, and (ii) the A/F amplitude exceeds the oxygen storage capacity of the catalyst.

20. The method as in claim 1, in which said burst period is in the range of 18-20 seconds.

21. The method as in claim 1, in which said burst period is initiated each time the engine begins to operate in closed-loop feedback mode.

22. The method as in claim 1, in which said burst period occurs only when the engine is operating in closed-loop feedback mode and the engine is in a steady-state speed condition.

23. The method as in claim 22, in which the interrogation or burst period is aborted if there is a substantial change in the steady-state speed condition of the engine during said burst period.

24. The method as in-claim 1, in which the degree of absence is measured according to the standard whereby the ratio of the sensor outputs is characterized as a function of conversion efficiency and said conversion efficiency is less than, 50%.

25. The method as in claim 1, in which degrees of absence of said substantial change is referenced and correlated to the degree of degradation of the catalyst.

26. The method as in claim 1, in which there is no system interconnection between the independent sensor and the feedback sensor.

27. The method as in claim 1, in which the signals of said independent sensor and the feedback sensor are integrated for engine emission feedback control by use of a supervisory gain control.

28. The method as in claim 1, in which said control has a proportional-integral calculator and a gain adjuster for said slow controller, the gain of the normal limit cycle being eliminated by said gain adjuster during the burst period to eliminate abrupt offset steps in the controller operation and thereby provide a signal from the independent sensor which is the same as the average value of the signal from the feedback sensor and thereby avoid erratic action.

* * * * *